Figure 8:
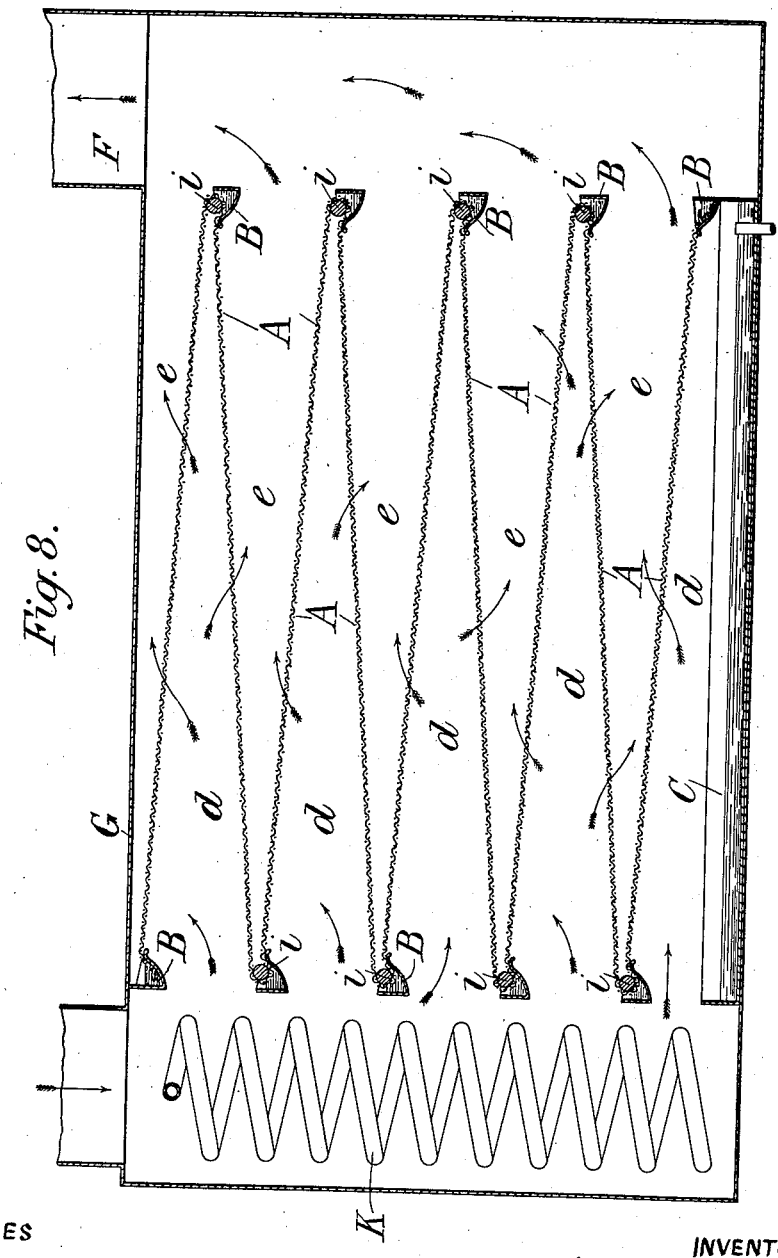

No. 833,686. PATENTED OCT. 16, 1906.
J. A. HART.
APPARATUS FOR USE IN VENTILATING WITH CONDITIONED, OR FILTERED, COOLED, OR WARMED AND MOISTENED AIR.
APPLICATION FILED AUG. 9, 1904.
10 SHEETS—SHEET 1.
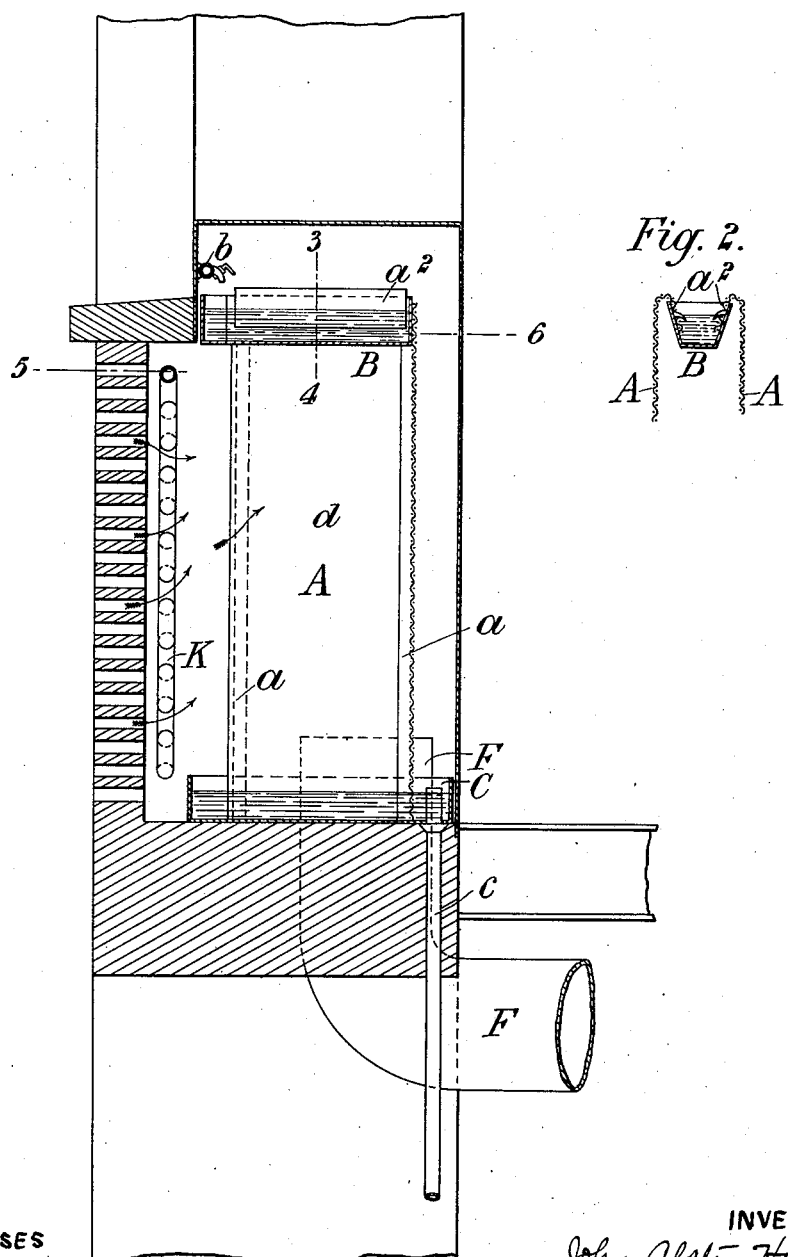

No. 833,686. PATENTED OCT. 16, 1906.
J. A. HART.
APPARATUS FOR USE IN VENTILATING WITH CONDITIONED, OR FILTERED, COOLED, OR WARMED AND MOISTENED AIR.
APPLICATION FILED AUG. 9, 1904.
10 SHEETS—SHEET 2.
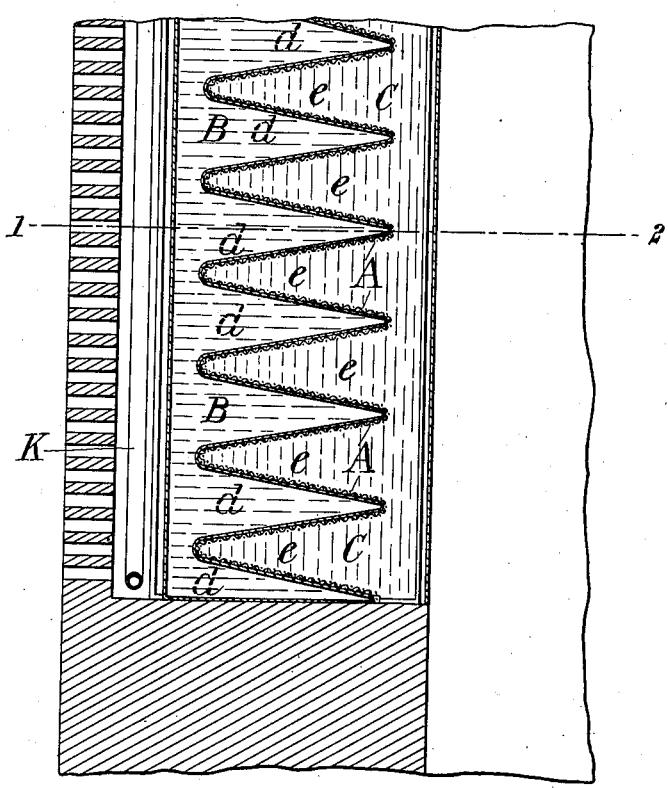
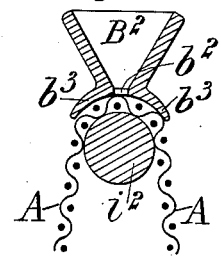
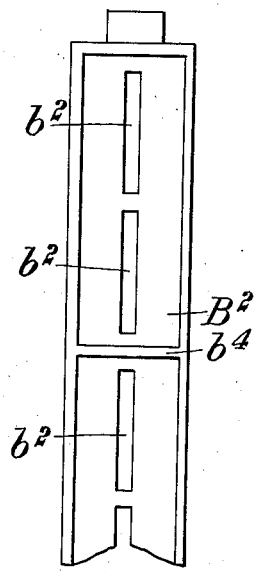

No. 833,686. PATENTED OCT. 16, 1906.
J. A. HART.
APPARATUS FOR USE IN VENTILATING WITH CONDITIONED, OR FILTERED,
COOLED, OR WARMED AND MOISTENED AIR.
APPLICATION FILED AUG. 9, 1904.
10 SHEETS—SHEET 3.
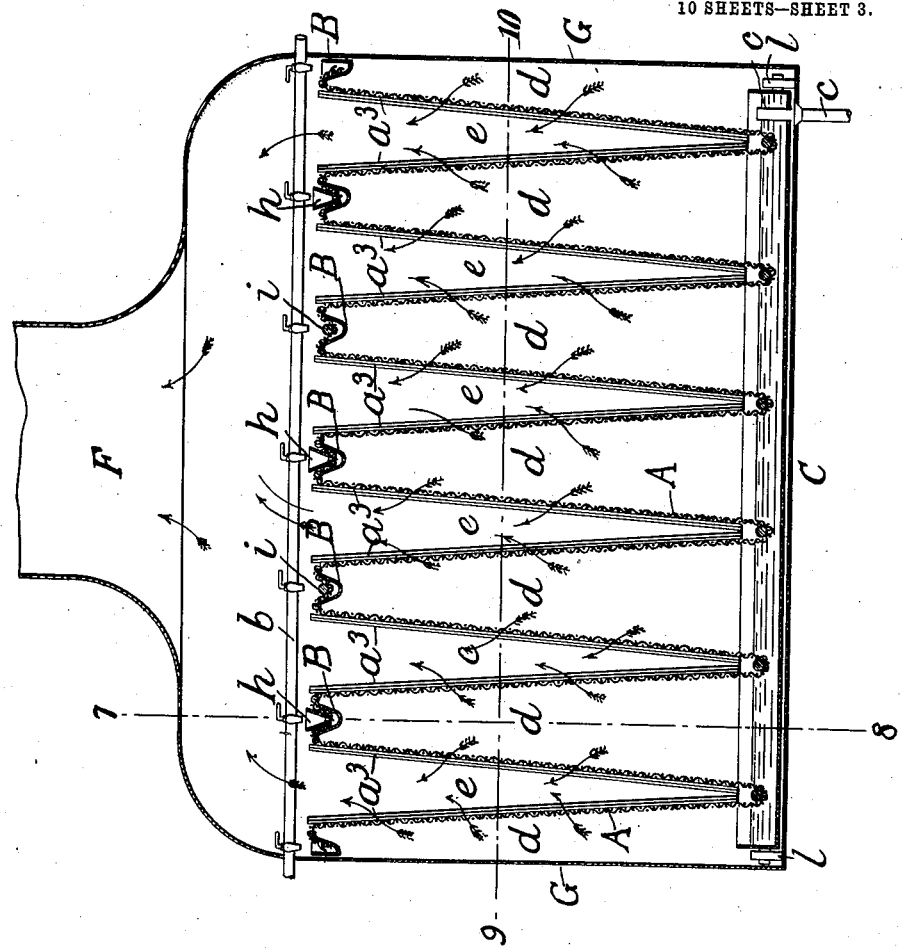
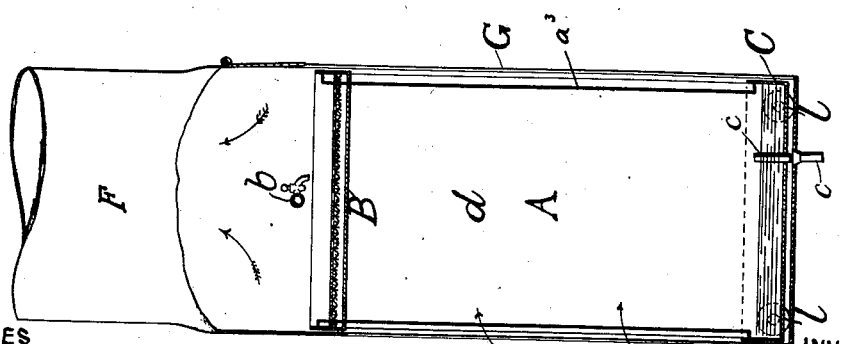
WITNESSES
INVENTOR
John Alston Hart
BY
Howson and Howson
ATTORNEYS No. 833,686. PATENTED OCT. 16, 1906.
J. A. HART.
APPARATUS FOR USE IN VENTILATING WITH CONDITIONED, OR FILTERED, COOLED, OR WARMED AND MOISTENED AIR.
APPLICATION FILED AUG. 9, 1904.
10 SHEETS—SHEET 4.
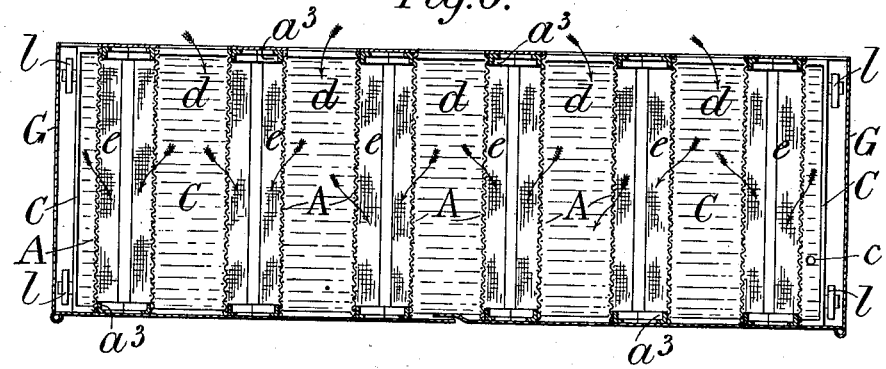
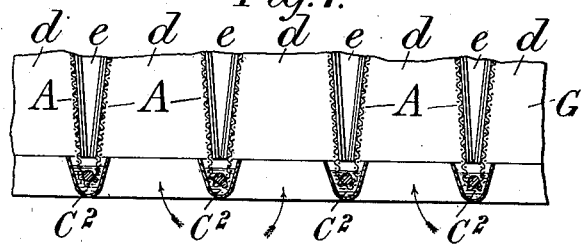
WITNESSES
J. C. Connor
Walter Abb
INVENTOR
John Alston Hart
BY
Howson and Howson
ATTORNEYS No. 833,686. PATENTED OCT. 16, 1906.
J. A. HART.
APPARATUS FOR USE IN VENTILATING WITH CONDITIONED, OR FILTERED, COOLED, OR WARMED AND MOISTENED AIR.
APPLICATION FILED AUG. 9, 1904.
10 SHEETS—SHEET 5.

WITNESSES
S. C. Connor
Walter Abba

INVENTOR
John Alston Hart
BY
Howson and Howson
ATTORNEYS

No. 833,686. PATENTED OCT. 16, 1906.
J. A. HART.
APPARATUS FOR USE IN VENTILATING WITH CONDITIONED, OR FILTERED COOLED, OR WARMED AND MOISTENED AIR.
APPLICATION FILED AUG. 9, 1904.
10 SHEETS—SHEET 6.
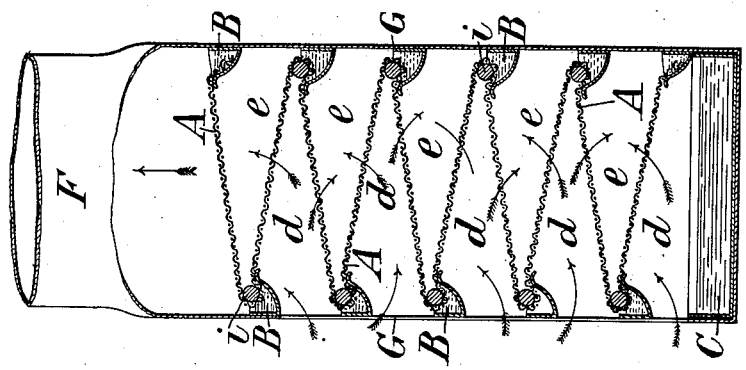
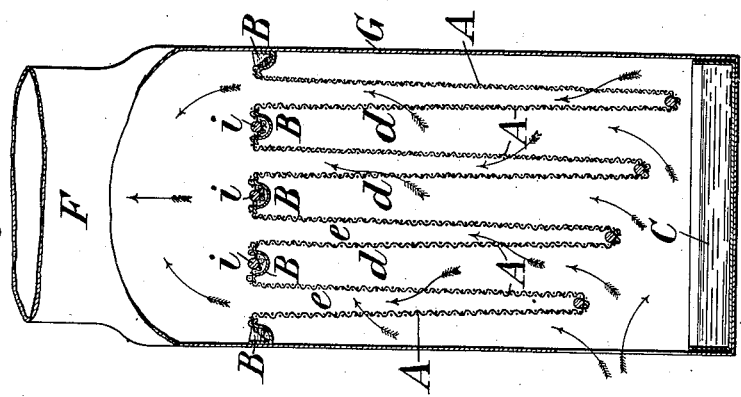
WITNESSES
INVENTOR
John Alston Hart
BY
Howson and Howson
ATTORNEYS No. 833,686. PATENTED OCT. 16, 1906.
J. A. HART.
APPARATUS FOR USE IN VENTILATING WITH CONDITIONED, OR FILTERED, COOLED, OR WARMED AND MOISTENED AIR.
APPLICATION FILED AUG. 9, 1904.
10 SHEETS—SHEET 7.

WITNESSES
INVENTOR
James A. Hart
BY
ATTORNEYS

No. 833,686. PATENTED OCT. 16, 1906.
J. A. HART.
APPARATUS FOR USE IN VENTILATING WITH CONDITIONED, OR FILTERED, COOLED, OR WARMED AND MOISTENED AIR.
APPLICATION FILED AUG. 9, 1904.

10 SHEETS—SHEET 8.

No. 833,686.  
J. A. HART.  
APPARATUS FOR USE IN VENTILATING WITH CONDITIONED, OR FILTERED, COOLED, OR WARMED AND MOISTENED AIR.  
APPLICATION FILED AUG. 9, 1904.

PATENTED OCT. 16, 1906.

10 SHEETS—SHEET 9.

WITNESSES

INVENTOR

ATTORNEYS

No. 833,686. PATENTED OCT. 16, 1906.
J. A. HART.
APPARATUS FOR USE IN VENTILATING WITH CONDITIONED, OR FILTERED, COOLED, OR WARMED AND MOISTENED AIR.
APPLICATION FILED AUG. 9, 1904.

10 SHEETS—SHEET 10.

WITNESSES

INVENTOR
James A. Hart
BY

ATTORNEYS

UNITED STATES PATENT OFFICE.

JOHN ALSTON HART, OF NOVAS, BLACKBURN, ENGLAND.

APPARATUS FOR USE IN VENTILATING WITH CONDITIONED OR FILTERED, COOLED, OR WARMED AND MOISTENED AIR.

No. 833,686.     Specification of Letters Patent.     Patented Oct. 16, 1906.

Application filed August 9, 1904. Serial No. 220,136.

*To all whom it may concern:*

Be it known that I, JOHN ALSTON HART, engineer, a subject of the King of Great Britain and Ireland, residing at Commercial Mills, Novas, Blackburn, in the county of Lancaster, England, have invented new and useful Improvements in Apparatus for Use in Ventilating with Conditioned or Filtered, Cooled, or Warmed and Moistened Air, of which the following is a specification.

My invention relates to apparatus for use in ventilating with conditioned or filtered, cooled, or warmed and moistened air, in which apparatus the air supplied is passed through moistened permeable material—such, for example, as coir or cocoa-nut matting—before it is distributed in the room or place to be ventilated. Apparatus of this character is described in the specification of Letters Patent No. 691,312, of 1902, granted to me.

The object of my present invention is to provide an apparatus which is more efficient, cheaper in first cost, and more convenient in use and also easier to clean, and this is chiefly effected by the arrangement of the permeable material and the means for moistening it, as hereinafter described, so that in a given space a greatly-extended area of the moistened permeable material is presented to the incoming air, and consequently the said air will pass through the moistened permeable material at a slower rate, and therefore be in contact with it for a longer time, and so increase the conditioning effect on the air, while the resistance to the passage of the air is lessened.

The means for cooling or heating the air before or after it passes through the moistened permeable material and the means for distributing the conditioned air into the room or other place may be of any convenient kind—such, for example, as those described and referred to in the aforesaid specification of Letters Patent of the United States, No. 691,312, January 14, 1902; but the permeable material is arranged in the air passage or chamber or casing containing it in a number of folds or depending loops or series of sheets, which hereinafter and in the claims I will refer to as "folds," suspended or supported in such a manner that a set of passages for the incoming air is constituted between the folds, and another set of passages for the outlet of air is constituted within the folds, the air passing through the very extensive area of moistened permeable material on its way from one set of passages to the other.

The accompanying drawings represent constructions in accordance with my invention; but I do not limit myself to the precise construction illustrated. In the several figures corresponding parts are marked with the same letters of reference.

Figure 13:
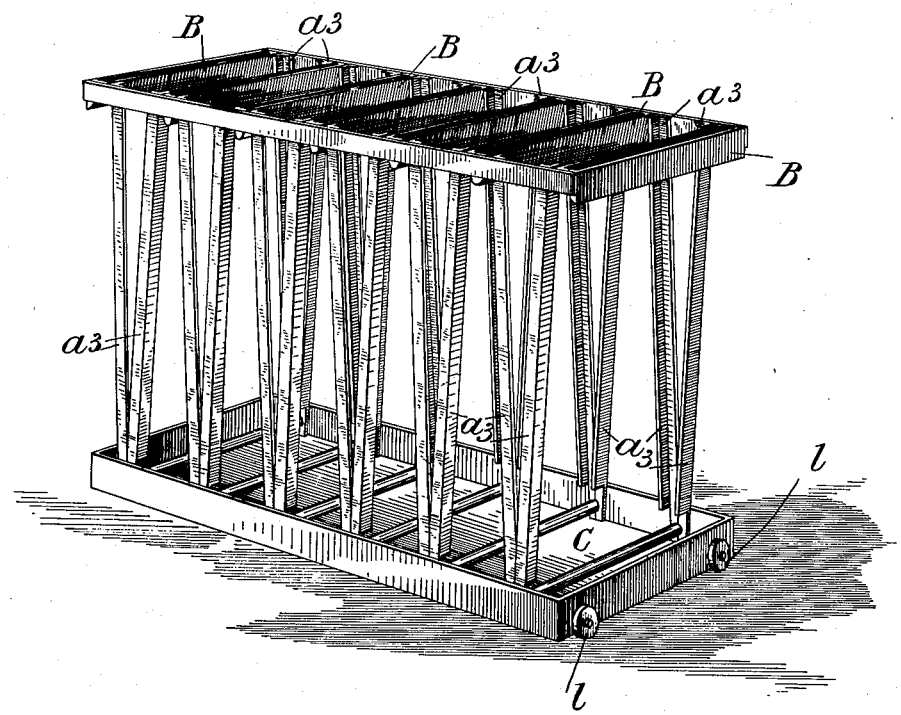
Figure 14:
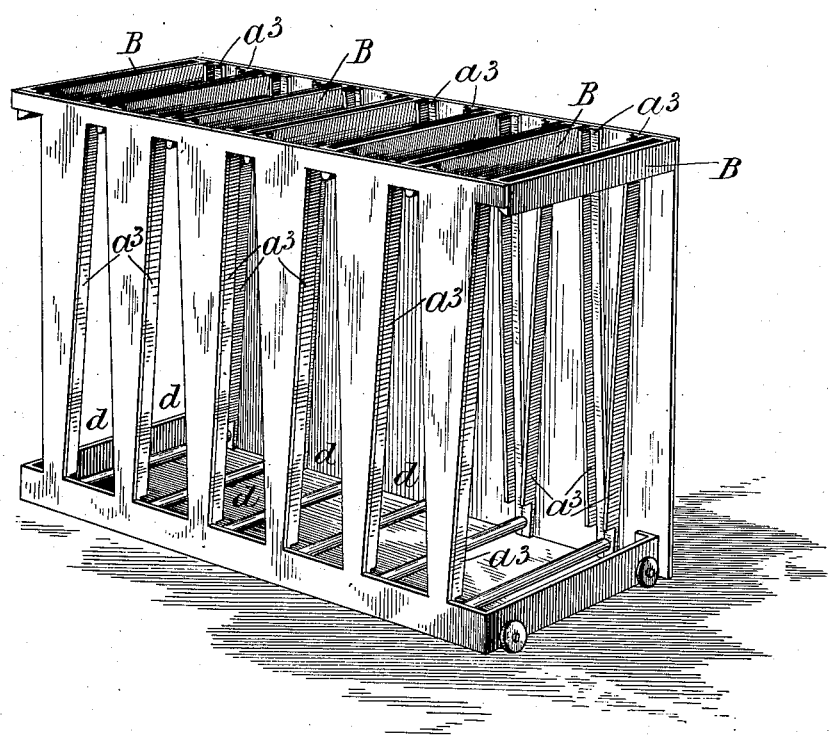
Figure 15:
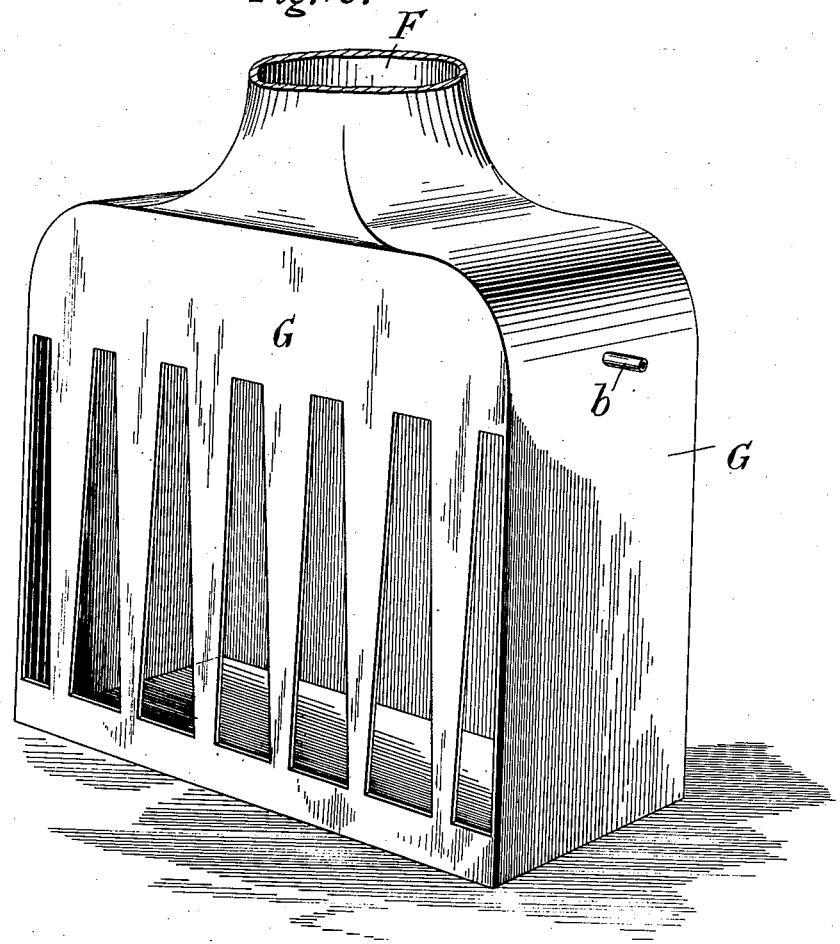
Figure 16:
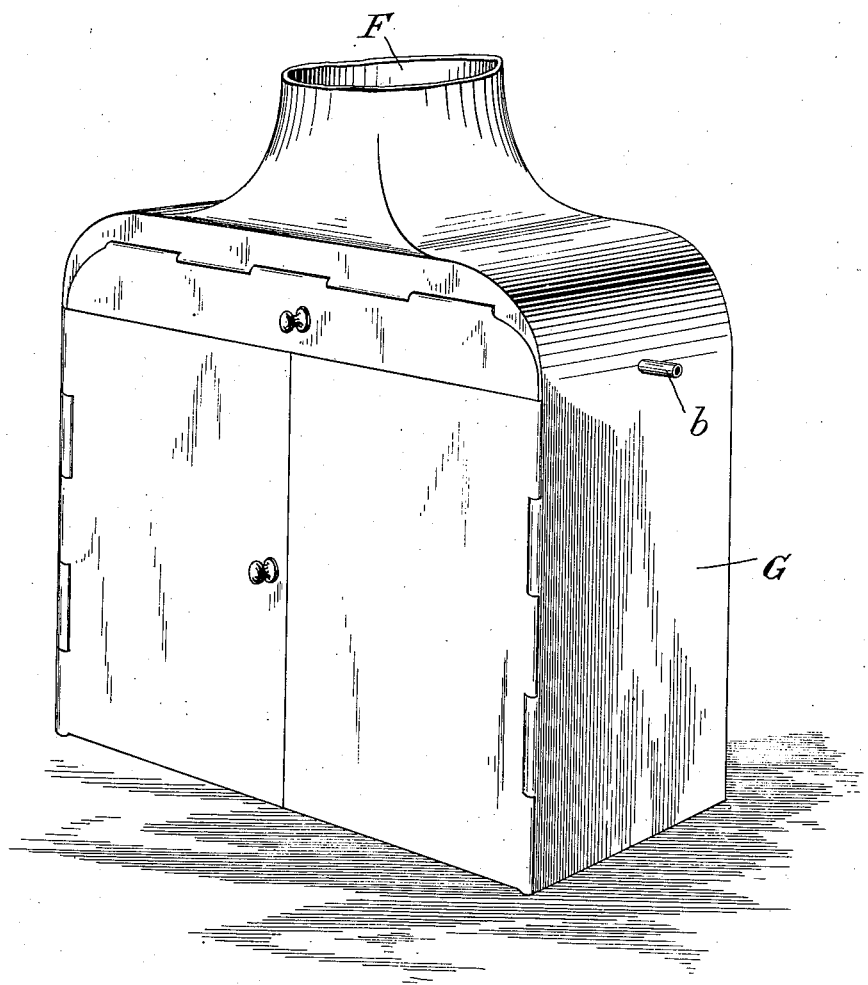

Figure 1 is a transverse section on the line 1 2, Fig. 3. Fig. 2 is a vertical section on the line 3 4, Fig. 1; and Fig. 3 is a section on the line 5 6, Fig. 1, of a construction such as is described and shown in the specification of my aforesaid patent, No. 691,312, but with my present invention applied thereto. Fig. 4 is a vertical section on the line 7 8, Fig. 5, with the doors of the casing removed. Fig. 5 is a vertical section at right angles to Fig. 4. Fig. 6 is a sectional plan on the line 9 10, Fig. 5. Fig. 7 is a detail view of a modification. Fig. 8 is a vertical section of a modification. Fig. 9 is a transverse section showing a different arrangement of folds. Fig. 10 is a transverse section showing the folds arranged crosswise. Fig. 11 is a vertical section of a water-trough and of a modified form of water-trough. Fig. 12 is a plan showing a further modification of a water-trough. Figs. 13 and 14 are perspective views showing different modifications of the framework supporting the permeable material run out of its casing. Fig. 15 is a perspective view of the casing; and Fig. 16 is a similar view of the same, showing the opposite side.

The permeable material A is arranged vertically in saw-tooth fashion, the uprights $a$, connected to the trough above and the trough below, keeping the material properly distended. By extensions $a^2$ of the permeable material dipping into the trough B and secured by hooks water supplied by the pipe $b$ (by a tap or taps to which access may be had through a door or doors in the casing or chamber) is conducted to the main body of the permeable material A, from the said trough B, which corresponds in form to the arrangement of the permeable material A, surplus water being received in the bottom trough C and passing off by the pipe $c$. External air enters as shown by the arrows and passes into the passages $d$ between the folds of the permeable material A through the said permeable material, and thence through the passages $e$ between the folds of the permeable material and through the pipe F to the place of utilization.

K represents the coil for attemperating the incoming air.

If desired, instead of the main body of the permeable material having extensions to dip into the water-trough B separate pieces of permeable material or wicks can be used to convey water from the said trough to the main body of the permeable material.

Fig. 6 is a sectional plan on the line 9 10, Fig. 5, showing a casing G, containing the permeable material A and its supports and water-distributing troughs, the said material being arranged in depending loops passing over the lipped edges of the water-troughs B, the permeable material being hooked in the end troughs B and being depressed in the other troughs B by either hollow bars $h$, with a slot or openings at bottom, or by rods, as at $i$. The troughs B are supplied with water under pressure by taps on the pipe $b$. The air is indicated by the arrows as entering from the side of the casing G into the passages $d$ and passing thence through the permeable material into the passage $e$ and therefrom to the outlet F. In this case (and in the other construction, where necessary) the air can be prevented from passing between the edges of the permeable material and the casing or support by guards $a^3$ on the side of the permeable material opposite to that at which the air enters the said material. These guards $a^3$ may be angle-bars, which constitute also the uprights of the support, being connected at top by cross-pieces to carry the water-troughs B and connected to the surplus-water trough C, the spaces between these uprights being preferably completely covered by a plate or plates on the side opposite to that at which the air enters and having plates on the air-entrance side covering only the spaces $e$ at the side, (leaving them open above,) but leaving open the side communications for air to enter the passages $d$. The bars or rods $h$ $i$ can be removably secured by square or other shaped projections at their ends passed into slots in the ends of the water-troughs and secured by catches. In this construction I have shown wheels $l$, upon which the structure supporting the moistening and filtering construction is carried, so that it can be run out from and back into the casing G, which is provided with tightly-closable doors for the purpose. The supports for the permeable material are secured to the trough C and so are run in and out with it. The air can enter from below, if desired, and in that case the trough C for the surplus water will be replaced by separate troughs $C^2$, as shown in Fig. 7, to allow of openings between them for the entrance of air, as shown by the arrows.

Fig. 8 is a vertical section of another arrangement with the loops of permeable material A arranged horizontally, there being water-troughs B at each end, into which part of the permeable material passing over the guides formed by the curved edges of the troughs B is kept depressed by rods $i$, the ends of the said material being secured in the uppermost and lowermost troughs by hooks. The air entering the casing G, as indicated by arrows, may in this as well as in the other arrangements first come into contact with an attemperating-coil K, and the said air passes in the direction of the arrows to the exit F from the casing G to the place where it is to be used.

Fig. 9 is a transverse section showing the lower ends of the loops of permeable material A arranged at different levels, so that the air entering in the direction indicated by the arrows has ready access to the passages $d$ between the loops of permeable material A. In this arrangement the permeable material is shown as being depressed into the water-troughs B by bars $i$, the ends of the permeable material being hooked in the two outermost of such troughs.

Fig. 10 is a transverse section of an arrangement analogous to that shown in Fig. 8, but with the passages $d$ and $e$ between the permeable material A arranged crosswise of the casing G instead of lengthwise thereof, the air entering the passages $d$, passing through the permeable material A, into a passage leading to the outlet F. The said material is held in the troughs, as in Figs. 8 and 9.

Fig. 11 is a vertical section, and Fig. 12 is a plan showing a modification in which the permeable material A is passed over rods or bars, as at $i^2$, and there is a water-trough $B^2$ above, which has slits $b^2$ in its lower part and guides $b^3$ for directing the water. The said trough B is preferably divided by partitions, as at $b^4$, to equalize the supply of water, and is provided with squared end projections to be held in slots in the casing or in the structure capable of being slid into and out from the casing or chamber.

The rods or supports for the permeable material and also the water-troughs may in all the constructions be connected to the casing or the structure in the casing or chamber in any convenient way, and such of them as have to be removable may be secured by screws or catches or other means of securing them in place and allow of their ready disconnection.

I claim as my invention—

1. An apparatus for ventilating having an air-passage containing a sheet of permeable material arranged to form a plurality of folds, so that a set of passages is provided for incoming air and another set of passages is provided for outgoing air, and means for supplying water to the loops of the folds of said permeable material.

2. An apparatus for ventilating, having an air-passage containing a sheet of permeable material arranged in a plurality of folds, so that a set of passages is provided for the incoming air and another set of passages is provided for outgoing air, in combination with means for supporting the permeable material in folds and means to deliver water to the loops of the folds of the permeable material.

3. An apparatus for ventilating, having an air-passage containing a sheet of permeable material arranged in a plurality of folds so that a set of passages is provided for incoming air and another set of passages is provided for outgoing air in combination with supports for the folds of said permeable material, and troughs for supplying water thereto, into which troughs the ends and loops of the sheet of permeable material dip.

4. An apparatus for ventilating, having an air-passage containing a sheet of permeable material arranged in a plurality of folds, so that a set of passages is provided for incoming air and another set of passages is provided for outgoing air, and means whereby the folded sheet of permeable material can be run into and out of place.

In testimony whereof I have signed this specification in the presence of two subscribing witnesses.

JOHN ALSTON HART.

Witnesses:
WILLIAM PIERCE,
SAMUEL GEORGE McCREEDY.